March 30, 1965
G. C. SWENSON
3,175,248
HEATER FOR MOLDING MATERIAL
Filed Nov. 27, 1961
4 Sheets-Sheet 1
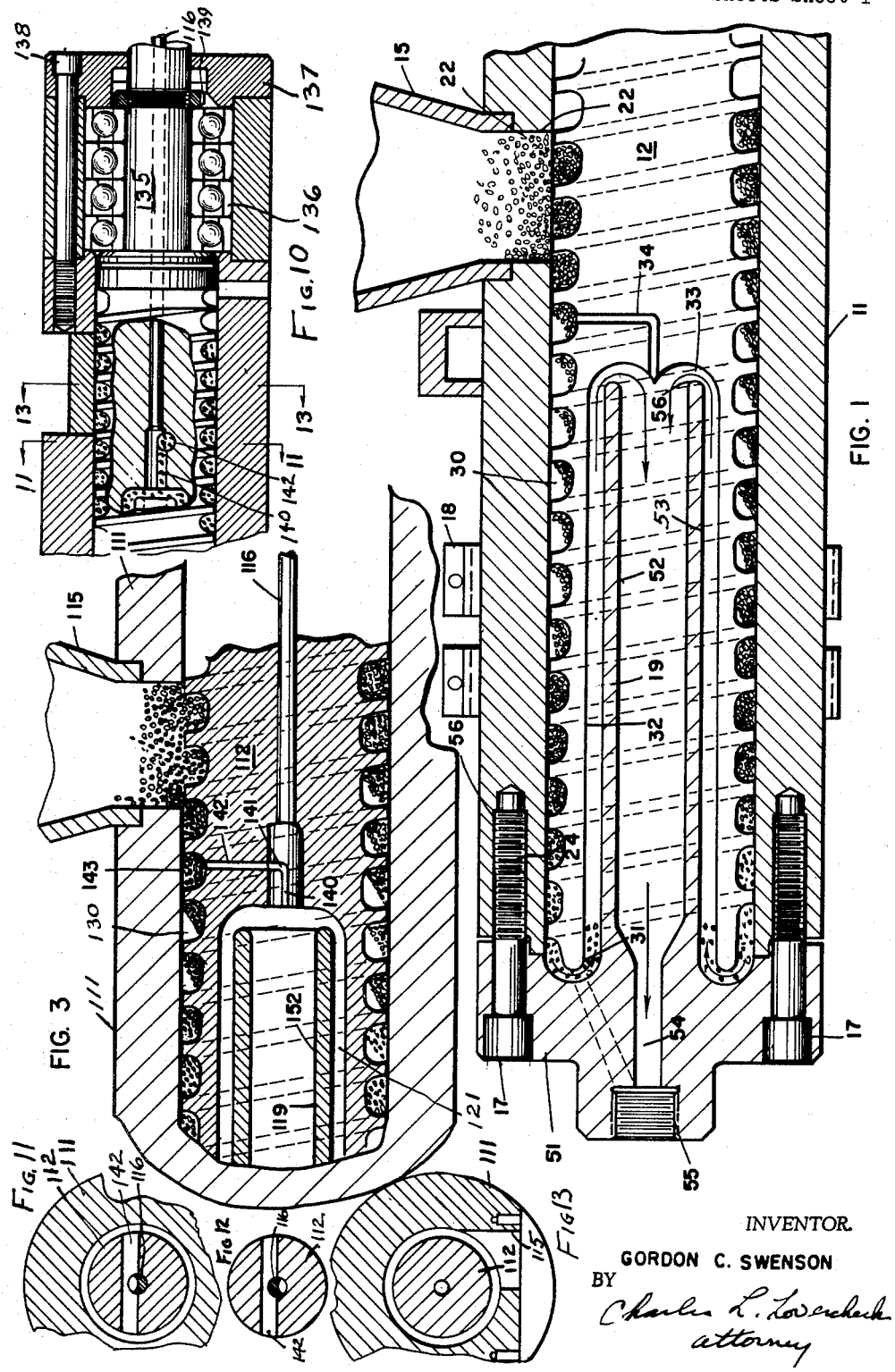
INVENTOR.
GORDON C. SWENSON
BY
Charles L. Lovercheck
attorney

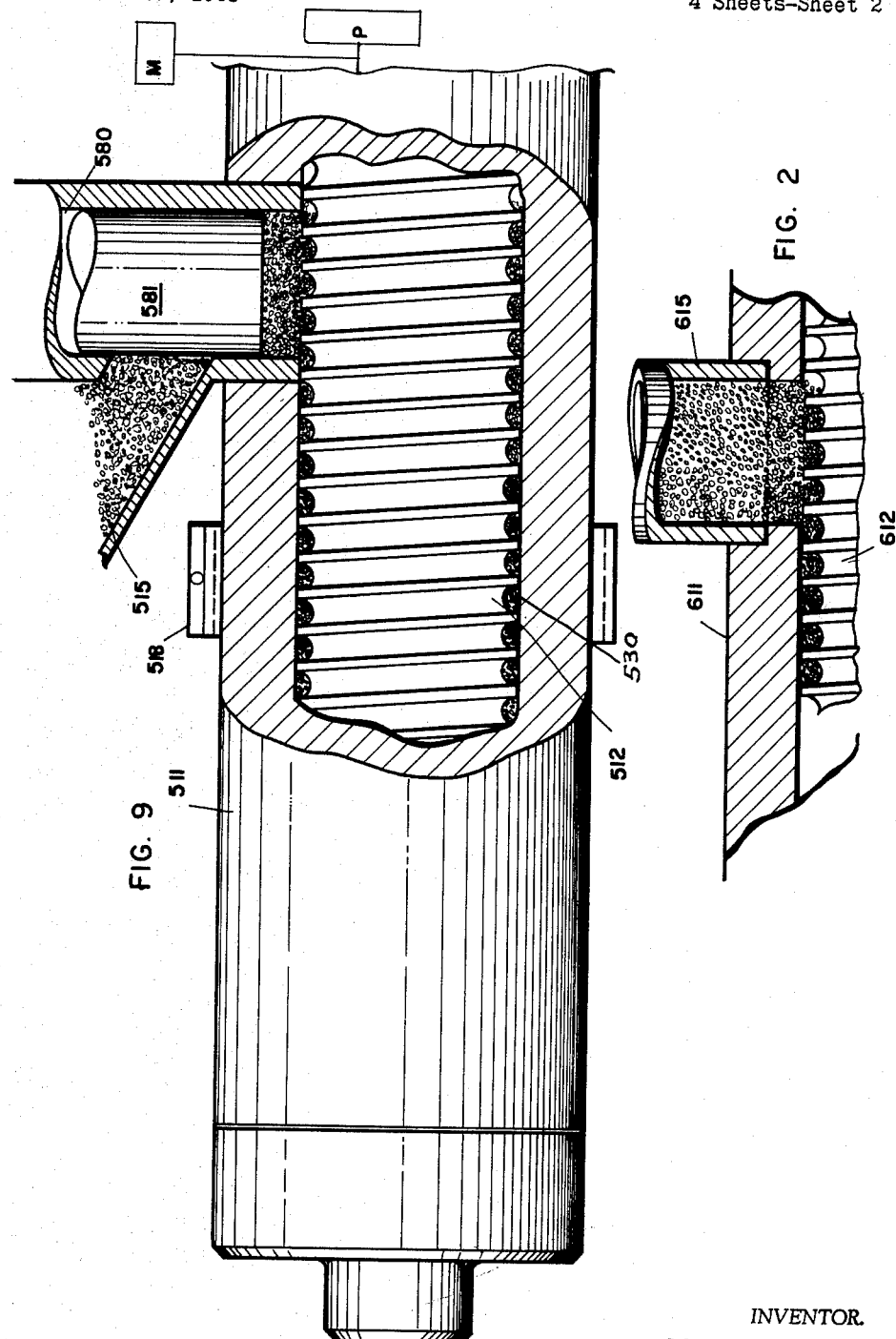

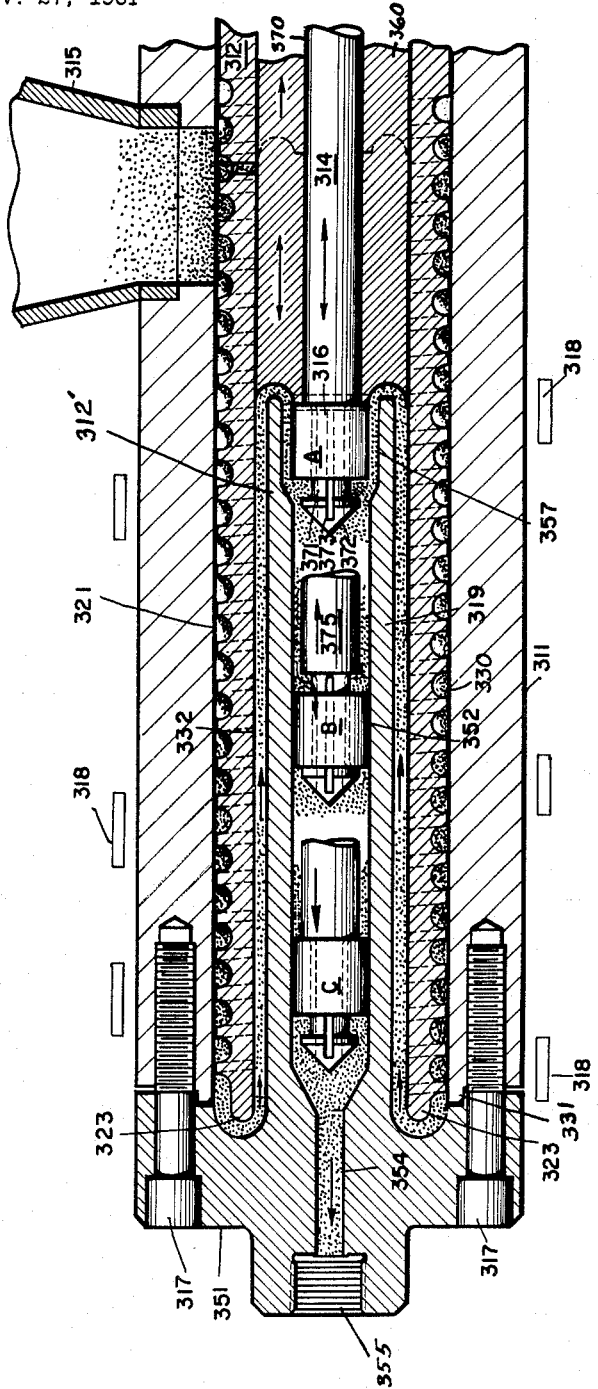

March 30, 1965  G. C. SWENSON  3,175,248
HEATER FOR MOLDING MATERIAL
Filed Nov. 27, 1961  4 Sheets-Sheet 4
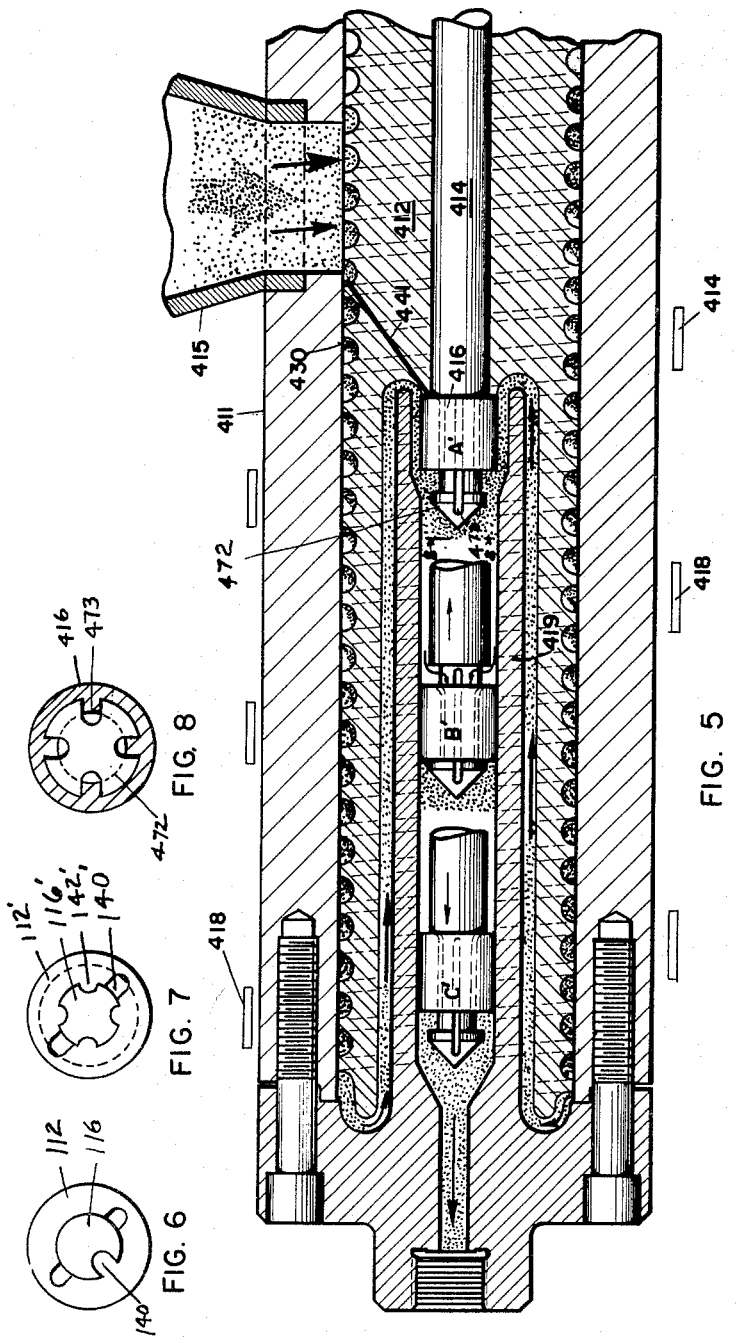
INVENTOR.
GORDON C. SWENSON
BY
Charles L. Lowersluch
attorney

United States Patent Office 3,175,248
Patented Mar. 30, 1965

3,175,248
HEATER FOR MOLDING MATERIAL
Gordon C. Swenson, 310 Arbuckle Road, Erie, Pa.
Filed Nov. 27, 1961, Ser. No. 154,988
8 Claims. (Cl. 18—30)

This invention relates to molding machines and, more particularly, to devices for injecting hot plastic material into molding dies.

This application is a continuation-in-part of patent application, Serial No. 733,526, filed May 7, 1958, which issued as Patent No. 3,010,154 on November 28, 1961, and presents an improvement over the said application.

In the said application, the basic concept of a reverse flow heater for plastic is disclosed. In the present application, a plastic heating device is provided having the reverse flow feature shown in the said application and, in combination therewith, utilizing an improved arrangement for injecting the plastic material.

The improved arrangement includes, with other features a screw feed. By using the screw feed action in combination with the reverse flow, it is possible to make the entire heater much shorter than a single screw action or a heater having a plunger feed. The arrangement also includes, but the invention is not limited to, a supplemental plunger in combination with a screw feed heater. The supplemental plunger prevents back pressure losses in the granule materials which often happen with a feeding mechanism using a screw for the sole pressure. The arrangement disclosed will also increase production output over prior devices. The heater can be used with or without a reciprocating screw. The supplemental plunger also forces the material through the heater faster and, therefore, provides a quicker, more thorough, and more expeditious clean out for color changes and the like than prior heaters.

The present application comprises the following concepts:

(1) The basic concept of a reverse flow screw where the material is fed down the outside of the screw, then carried back inside a hollow in the screw, and thence forward through a tube in the center of the hollow of the screw to a discharge point. This is a counterpart of the basic reverse flow heating device disclosed and claimed in the said parent application.

(2) The concept of a heater having a reverse flow screw with a vent hole therein to permit constant recirculation of the plastic from the hollow in the screw to the flute thereof and to allow the gases generated by the melting of the plastic and the air trapped in the granules to escape back into the area of the heater where granular material is still present.

(3) The concept of a valve located inside the screw in a heater which has a means to open or close the aforementioned vent at will. This valve may be operated through the back of the screw as disclosed in the drawings herein. The flow of plastic can actually be changed and controlled by turning the valve whereas the previously mentioned concept determines the flow by the size of the vent hole which is drilled in the device.

(4) The basic concept of a plunger going through the center of a reverse flow heater such as disclosed in the parent case wherein the plastic material makes two complete reversals of flow during its travel through the heater and wherein a plunger is used in combination therewith to force the plastic through the screw to the die during shots. In this concept, a plunger and a sliding sleeve on its tip prevent the plastic from passing through the openings under the sleeve on the forward stroke of the plunger. As the plunger is retracted, the sleeve is moved to a rearward position, closing the openings and preventing the plastic from flowing through the slots. The sleeve is actuated in one direction by the forward motion of the plunger pushing on the sleeve. In the rearward direction, the valve is actuated by the force of the plastic passing through it and causing the plunger to move to a rear position. In another embodiment disclosed herein, a sleeve type auxiliary piston is added around the plunger. The purpose of this sleeve piston is to overcome the bulb factor or shot size limitation inherent in a heater without a plunger. By use of the auxiliary plunger, the capacitiy of the machine can be increased within practical limits.

(5) In another embodiment, an auxiliary plunger is provided actuated by air, oil, or mechanical means for forcing plastic through the flute of a screw. The purpose of this auxiliary plunger is two-fold:

(1) To maintain full pressure at the point of discharge; and
(2) To fill up all the voids normally found in the feed portion of a screw.

By doing this, the auxiliary plunger or movable screw is used without the pressure losses found in the present movable plunger type injection molding machines. In these machines, pressure is lost because the plastic backs up around the groove of the screw because the granules are not held firmly in place by the auxiliary plunger which constitutes a radical innovation over known machines.

More specifically, it is an object of the present invention to provide an improved heater for plastic material.

Another object of the invention is to provide a heater for plastic having a screw feed supplemented by a plunger to force plastic through the flutes of the screw.

Still another object of the invention is to provide an improved heater wherein a rotatable screw supplies force, urging the plastic material through the heater and through a path which makes at least two axial reversals in direction of flow therethrough.

Yet another object of the invention is to provide an improved heater for plastic materials wherein a rotatable screw supplies a force to urge the plastic material through the reverse passages of a heater and part of the plastic may flow through a bypass around the screw and thence through a path inside the screw to an outlet of the heater.

A further object of the invention is to provide an improved plastic heater as aforesaid having a rotatable screw therein wherein a venting means is provided to direct hot gases from the material adjacent the outlet to the material adjacent the inlet and a control is provided to open and selectively close the vent.

Still a further object of the invention is to provide a heater for plastic having a screw feed supplemented by a plunger to force plastic through the flute of the screw and an auxiliary plunger is provided inside the screw.

Yet a further object of this invention is to provide a heater for plastic having a screw feed supplemented by a plunger to force plastic through the flute of the screw and an auxiliary plunger is provided inside the screw with an improved flow direction control on the auxiliary plunger tip.

It is a further object of the invention to provide a heater for plastic having a screw feed supplemented by a plunger to force plastic through the flute of the screw and an auxiliary plunger is provided inside the screw with an improved flow direction control on the auxiliary plunger tip and a second auxiliary plunger provides additional force selectively on the plastic.

It is yet a further object of the invention to provide an improved plastic heater which is simple in construction, economical to manufacture, and simple and efficient in operation.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit of sacrificing any of the advantages of the invention.

In the drawings:

FIG. 1 is a view of a plastic heater according to the invention;

FIG. 2 is a partial view of another embodiment of the invention;

FIG. 3 is a partial view of still another embodiment of the invention;

FIG. 4 is a partial view of yet another embodiment of the invention;

FIG. 5 is a partial view of still yet another embodiment of the invention;

FIG. 6 is a cross sectional view taken on line 6—6 of FIG. 5;

FIG. 7 is a cross sectional view taken on line 7—7 of FIG. 5;

FIG. 8 is a cross sectional view taken on line 8—8 of FIG. 5;

FIG. 9 is a view of yet another embodiment of the invention;

FIG. 10 is a partial view of the device shown in FIG. 3;

FIG. 11 is a view taken on line 11—11 of FIG. 10;

FIG. 12 is a cross sectional view similar to FIG. 11 with the valve rotated to closed position; and FIG. 13 is a cross sectional view taken on line 13—13 of FIG. 10.

The heater shown in FIG. 1

Now with more particular reference to the drawings, in the embodiment shown in FIG. 1, a heater for plastic material is shown made up of a hollow barrel or body 11 having a screw 12 therein. The screw is provided with a suitable motor to rotate it which may be connected to a suitable shaft such as shaft 135 in FIG. 3. The barrel 1 has a hopper 15 which supplies granular plastic material to the inlet where it enters the flute which is a spiral groove in the periphery of the screw which directs the plastic to an outlet tube 19 and thence to the molding die. The outlet tube 19 has an outwardly directed flange 51 integral therewith. The flange is secured to the barrel 11 by bolts 17.

The body of the heater generally forms a hollow cylindrical bore closed at the outlet end by the flange 51 and having a cylindrical inside surface which is made of a proper size to form a fairly close fit with the outer crests of the spiral defining the flute on the screw 12. An inlet opening 22 is provided in the body which conducts granular plastic from the hopper 15 to the inlet end of the screw.

The outlet end of the body has an axially extending flange 23 thereon which fits into a mating groove defining a counterbore in the flange 51. The barrel 11 has spaced threaded bores 24 which receive the bolts 17. The bolts 17 are disposed in counterbored holes in the flange 51 and hold the outlet tube 19 in position concentric with the hollow in the screw. A suitable conventional type heating arrangement 18 such as generally used on devices of this type is provided around the outside of the heater which may be an electrically heated device.

The screw 12 has a generally cylindrical outside configuration with a spiral groove 30 forming a flute in its outer periphery extending from the inlet side of the hopper 15 to an end 31 of the screw. The flute provides a path for plastic material from the hopper to the end 31 of the screw. It will be seen that the screw, when rotated, has an action something like a sausage stuffer which moves the granular material along toward the outlet end at 31. The flute may be partly filled adjacent the hopper as shown but will be completely filled remoter therefrom as plastic melts and backs up. The plastic material will generally be in granular form as it leaves the hopper and it will be plasticized as it is forced forward by the screw. It will be thoroughly agitated as it reverses its direction around and through the tube 19 as described in the parent application.

The end 31 of the screw 12 is rounded to provide a smooth path for the material to move from the flute into the passage between the inside bore of the screw and the outside of the tube 19. The inside of the screw has a smooth cylindrical surface 32 which defines the outside surface of a cylindrical passage annular in section between the tube 19 and the inside of the screw 12. The cylindrical surface 32 defining the hollow bore in the screw terminates in a blind end 33 having a conical end surface extending toward the tube 19. This conical surface directs plastic through the tube 19.

A bleed passage 34 communicates from the inside of the bore defined by the cylindrical surface 32 at the apex of the conical surface on the end 33 to the groove 30 forming the flute in the screw just downstream from the inlet opening 22. This bleed passage conducts a smooth amount of melted plastic back to the flute adjacent the inlet as well as returning objectionable entrained gases from the melted plastic. This melted plastic mixes with the granular material, fills the voids therebetween, thereby increases the rate of heat transfer and, consequently, increases the melting rate thereof as well as removing gases.

The hopper 15 may be of any convenient arrangement suitable to receive a practical amount of granular material to operate the machine.

The tube 19 is generally hollow and cylindrical and it has a smooth inner cylindrical bore 62 and a generally cylindrical outer surface 53 which define the tube and terminate in the rounded inner end. An outlet passage 54 is slightly reduced in size and it terminates in a threaded counterbore 55 adapted to receive a nozzle. Spaced counterbored bolt holes 56 are formed in the flange 51 and these bolt holes receive the bolts 17 which threadably engage the threaded bores 24 and firmly clamp the flange 51 to the body with the tube 19 fixed thereto in position and extending into the bore in the screw.

It will be seen that a flow passage is defined from the hopper around the flute 30 and around the end 31 to the annular passage between the tube 19 and the inside of the bore of the screw to the outlet passage. The plastic material makes a complete reversal at the end 31 of the screw 12 to flow in an axial direction toward the inlet opening 22. Then it makes another complete reversal around an end 56 of the tube to flow through the tube 19 to the reduced size passage 54 and thence to a nozzle or molding die. It will be noted that as the granular material progresses from the hopper 15 toward the end 31 of the screw, it is plasticized by heat from the conventional heating source 18 and the plasticizing continues in the passage between the surface 53 of the tube 19 and the inner surface 32 of the screw as heat is transferred from the body 11 and hot plastic in the flute 30.

The screw 12 may be rotated by means of a motor such as motor M shown in FIG. 9 and it may be reciprocated by means of the hydraulic cylinder P having a piston therein connected to a piston rod. This piston may be the main plunger of the machine.

The heater shown in FIG. 3

In the embodiment of the invention shown in FIG. 3, a hopper 115 feeds plastic material to a cylindrical hollow barrel 111 with a screw 112 therein. The screw and barrel are similar to corresponding parts shown in FIG. 1; however, in FIG. 3, a vent shut-off is provided to control internal recirculation of plastic and to permit continuous screw rotation when the outlet is obstructed.

In this embodiment, the barrel 111 is shown having the screw 112. A discharge tube 119 is disposed in a cylindrical bore 121 of the barrel. A valve 116 is movably received for rotation in the counterbored hole in the screw 112 and is concentrically and axially disposed therein.

The valve 116 has an axial longitudinal groove 140 and a radial hole 141 communicating therewith. The radial hole 141 completes a flow path with a radial passage 142 in the screw 112 from inside the screw to the flute in the outside thereof when the valve 116 is turned to the position shown. When the valve 116 is rotated by rotating it inside a shaft 135, it turns the hole 141 out of alignment with the passage 142, closes the inner end of the passage 142, and thereby shuts off the flow path from the inside of the screw adjacent a tube 152 to a flute 130 at 143 just downstream of the inlet.

The rotation of the shaft of the valve 116 controls the opening and closing of the passage 142 and, thereby, the internal recirculation of plasticized material from inside the tube 119 to the flute 130 adjacent the hopper 115. Thus, by opening the valve, as the screw 112 rotates, it causes a continuous recirculation of material around through the flute, up through the tube, and through passage 142 back to the flute at 143. When the screw is rotated to shut off the hole 141 and the passage 142, the material cannot recirculate. Therefore, it is urged toward the outlet by the screw. It is forced through the tube 152 and out the discharge passage to a molding die.

The rotation of the screw 112 can be synchronized with the time of the charging cycle of the machine so that by continuously rotating the screw 112, intermittent injection of material from the discharge to a molding die can be accomplished.

The shaft 135 is fixed to the screw 112. The shaft 135 is considerably smaller in diameter than the screw 112 and joins it at a shoulder. Shaft 135 is received in thrust bearings 136 which have their outer races clamped between the barrel 111 and a cover 137 by bolts 138. The inner races of the bearings 136 are clamped to the shaft 135 by a nut 139. The shaft 135 may be driven by a suitable drive and valve 116 may have a suitable actuation means.

*The heater shown in FIG. 4*

In the embodiment of the invention shown in FIG. 4, a heating device is shown having a hollow barrel or body 311 and a hollow screw 312 therein with a plunger 314 reciprocable in the screw adjacent a discharge tube 319. The plunger may be driven by the main plunger of the molding machine. A hopper 315 supplies granular plastic material to the spiral groove or flute 330 in the periphery of the screw. The rotation of the screw 312 forces plastic supplied by the hopper from the flute 330 to the passage between the tube 319 and the inside of the screw 312 and thence into the tube 319. At each injection cycle, the plunger 314 moves forward with a sleeve 316 acting as a piston in the tube 319, driving material through tube 319 toward the outlet. As plunger 314 moves forward, it moves sleeve 316 from its position A in a counterbore 357 to the tube inside a bore 352 when the sleeve 316 acts as a piston and forces the material in tube 319 out of the outlet 355. On its forward stroke, sleeve 316 closes passage 373 so that no plastic can flow therethrough.

A conventional heating and cooling system is provided for the cylinder indicated at 318 and the tube having an integral flange 351 thereon is attached to the barrel 311 by means of bolts 317. The plunger 314 has a reduced size portion with the sleeve 316 slidably received thereon which provides a valve which performs as hereinafter described.

The barrel or body has a hollow internal cylindrical bore 321 therein in which the crests of the screw defining flute 330 freely rotate. The discharge end of the barrel has a flange 331 which interfits in a counterbore in the flange 351 to form a tight joint when the flange 351 is bolted in place. The tube 319 is integrally attached to the flange 351 and the counterbore 357 is formed concentric to the bore in the tube around the outside thereof to provide a smooth flow passage for plastic to flow around an end 323 of the screw into the space between the screw and the tube.

The screw 312 has a cylindrical bore 332 therein which receives the tube 319 in spaced concentric relation thereto defining an annular passage therebetween and an auxiliary plunger 360 reciprocates in the hollow bore 332. The sleeve 316 acts as a piston in the tube 319 as it moves forward. It opens and closes grooves 373 to give a pumping action as it reciprocates.

The tube 319 has a reduced size outlet passage 354 which communicates with the threaded outlet 355 to which a suitable nozzle can be attached. Spaced bores are provided to receive the bolts 317 which firmly clamp the flange 351 to the body.

The auxiliary plunger 360 is slidably received in the cylindrical bore 332 in the screw 312. The plunger 314 has a shaft 370 which is slidably received in a bore in auxiliary plunger 360. The shaft 370 has a reduced size end 371 having a head 372 on the distal end thereof. The sleeve 316 slides freely on the reduced size end 371. The axial grooves 373 are formed in the reduced size end and through the head 372 so that when the sleeve is in the retracting position B, a passage will be provided from the head through the grooves 373 under the sleeve to the portion adjacent a shoulder 375, allowing flow through the grooves 373 toward the outlet. When the plunger 314 is moving toward the left in the figure on the discharge stroke, the pressure of the plastic on the sleeve 316 will force the sleeve 316 to the position shown at A and one end of the sleeve will bottom on the shoulder 375 and close the groove 373 so that plastic cannot flow through it.

The tube 319 is generally cylindrical and has the counterbore 357 which receives the sleeve 316 when the plunger is in the retracted position shown at A. When the plunger moves toward the outlet end on the discharge stroke, the sleeve forms a close fit with the inside of the bore 352 in tube 319 to drive plastic positively ahead of it through the outlet passage 354 into a molding die.

The auxiliary plunger 360 may reciprocate in suitable timed sequence to drive the plastic material forward toward the outlet passage 354. The length of stroke of the auxiliary plunger 360 can be regulated as desired. Resistance of the plasticized material in the flute 330 of the screw 312 will resist its flow back toward the hopper 315.

*The heater shown in FIG. 5*

The embodiment of the invention shown in FIG. 5 is identical to that shown in FIG. 4 except that no auxiliary plunger such as plunger 360 in FIG. 4 is provided and, in addition to the structure shown in FIG. 4, a bleed back passage 441 is provided through a screw 412 communicating between the inside of the screw adjacent to a sleeve 416 and a spiral groove 430 on the outside of the screw. In this embodiment, sleeve 416 not only closes groove 473 on its forward stroke as at C' but it also closes the passage 441 when retracted to position A'. It opens the groove 473 while retracting.

The plunger 414 may be reciprocated by a suitable piston; for example, a piston such as indicated at P in FIG. 9. When the plunger 414 is in its completely retracted position, the pressure of plastic material in the downstream end of the sleeve 416 as well as the force exerted on the downstream end of the sleeve 416 by the head 472 will cause the sleeve to completely close the passage 441.

It will be seen that the index numerals of the parts in FIG. 5 corresponding to similar parts in FIG. 4 are indicated by numerals having four hundred added thereto instead of three hundred as indicated in FIG. 4.

*The heater shown in FIG. 9*

In the embodiment of the invention shown in FIG. 9, a heater is shown wherein an injection plunger 581 reciprocates at the inlet to force material through a flute 530 of the screw 512 to supplement the force on the plastic exerted by screw 512 and force it through the flute 530 to the discharge (nozzle) at high pressure. (Normally, 20,000 p.s.i. is used to force the material.)

The heater is shown having a hollow barrel 511 similar to the barrel 11 shown in FIG. 1 with the screw 512 rotatable in the hollow thereof. The screw itself acts as a plunger indicated at P which may be the plunger of a molding machine. A motor M rotates the screw 512 through a suitable drive.

A hopper 515 is provided with a vertical internal cylindrical surface in which the injection plunger 531 reciprocates. Therefore, the screw 512 can be rotated constantly by the motor M and when it is desired to inject a charge of material into a die, the plunger 531 can be forced down to force granular material toward the flutes on the screw 512 and, at the same time, the screw 512 can be reciprocated forward by the plunger P. The plunger 531 will supplement the force of the screw rotation on plunger P to aid in the forward movement of the material.

A conventional heating and cooling source 518 is provided on the heater.

*The heater shown in FIG. 2*

In the embodiment of the invention shown in fragmentary section in FIG. 2, a loose gravity feed is used prior to the power feed and injection plunger used to fill up normal voids in the feed area of the groove in a screw 612. The screw 612 is supported in a body or barrel 611 and plastic material from a hopper 612 is urged to flow by gravity into the flutes of the screw. The screw 612 can be rotated by a motor such as the motor M in FIG. 9 and it can also be reciprocated, if desired, by means of a plunger such as plunger P in FIG. 9.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A heating cylinder for use in the injection molding of plastic material comprising a hollow barrel closed at one end and having an inlet communicating with said hollow and adapted to be connected to a source of relatively cold plastic material, an outlet adapted to be connected to die means, a rotatable hollow screw conveyor with a hollow portion extending inwardly from the downstream end thereof in said hollow barrel, said conveyor extending into said hollow substantially to said closed end and having a spiral groove in the periphery thereof extending from said inlet toward said closed end, an outlet tube in said hollow screw conveyor generally concentric thereto and connected to said outlet, said tube extending into said hollow conveyor a substantial distance, the inside of said hollow barrel and said spiral groove in said conveyor comprising a first passage, the inside of said hollow screw conveyor and the outside of said tube comprising a second passage annular in cross section, the inside of said tube comprising a third passage, said first, second, and third passages being connected in series, and heating means on the outside of said hollow barrel for melting plastic in said passages.

2. The cylinder recited in claim 1 wherein the cross sectional area of said third passage is less than the cross sectional area of said first and second passages whereby the velocity of flow of plastic material through said third passage increases over the velocity of flow through said second passage.

3. The heating cylinder recited in claim 1 wherein a spiral groove is formed in the periphery of said screw extending from said inlet to the end of said screw adjacent said discharge end.

4. The heating cylinder recited in claim 1 wherein a passage is provided in said conveyor connecting said inlet with the inside of said hollow conveyor, said passage defining a bleed back whereby gases and some melted plastic from inside said hollow barrel can return to said inlet and mix with unmelted plastic therein.

5. The heating cylinder recited in claim 4 wherein a control means is provided in said screw to selectively open and close said bleed back flow path.

6. The cylinder recited in claim 5 wherein said control means is controlled by a member in said screw extending axially thereof and terminating outside said screw.

7. The cylinder recited in claim 6 wherein said screw has an axial counterbore therein and said means to control said control member comprises an elongated member movable in said axial counterbore.

8. The heating cylinder recited in claim 1 wherein means is provided to reciprocate said screw conveyor in said barrel.

References Cited by the Examiner
UNITED STATES PATENTS

| | | | |
|---|---|---|---|
| 2,790,203 | 4/57 | Dykehouse | 18—30 |
| 2,944,288 | 7/60 | Sherman | 18—30 |
| 2,961,706 | 11/60 | Swenson | 18—30 |
| 2,977,634 | 4/61 | Morse | 18—30 |

FOREIGN PATENTS 206,523 11/55 Australia.

MICHAEL V. BRINDISI, *Primary Examiner.*
ROBERT F. WHITE, *Examiner.*